United States Patent [19]

Tenma

[11] Patent Number: 4,994,924
[45] Date of Patent: Feb. 19, 1991

[54] REPRODUCING PROCESSOR ALLOWING SELECTIVE INHIBITION OF DROPOUT COMPENSATION AND VIDEO SIGNAL CORRECTION PROCESSING

[75] Inventor: Tetsuya Tenma, Saitama, Japan

[73] Assignee: Pioneer Electronic Corporation, Tokyo, Japan

[21] Appl. No.: 363,013

[22] Filed: Jun. 8, 1989

[30] Foreign Application Priority Data

Sep. 16, 1988 [JP] Japan ............................ 63-231892

[51] Int. Cl.$^5$ ............................................. H04N 5/94
[52] U.S. Cl. .................................................. 358/336
[58] Field of Search ............. 360/10.3, 10.2, 10.1, 360/33.1, 35.1, 70, 74.1, 64, 37.1, 77.13, 77.16, 77.05, 73, 68, 73.09, 9.1, 84, 38.1; 358/312, 338, 335, 906, 909, 324, 312, 336

[56] References Cited

U.S. PATENT DOCUMENTS

| 4,423,498 | 12/1983 | Kimura et al. | 358/338 |
| 4,604,655 | 8/1986 | Moyiyama | 358/343 |
| 4,680,647 | 7/1987 | Moriyama | 358/343 |
| 4,805,034 | 2/1989 | Kitamura et al. | 358/310 |
| 4,811,127 | 3/1989 | Okauchi | 360/68 |
| 4,833,664 | 5/1989 | Shiragami et al. | 358/336 |
| 4,837,637 | 6/1989 | Akiyama et al. | 358/342 |

Primary Examiner—Donald McElheny, Jr.
Attorney, Agent, or Firm—Sughrue, Mion, Zinn, Macpeak & Seas

[57] ABSTRACT

A reproducing processor for processing a video format signal and allowing, during dropout, selective inhibition of at least one of dropout compensation and video signal correction processing, for preventing production of uncorrectable errors due to a processsing of digital data of the video format signal. Included are: a dropout compensation component for carrying out dropout compensation for a video format signal obtained from the reproducing component in the absence of a digital data signal reproducing command, and not carrying dropout compensation in response to the digital data signal reproducing command; and a signal selection component for selectively outputting an output of a waveform shaping component in response to the digital data signal reproducing command, and for selectively outputting an output of a signal processing component in the absence of the digital data signal reproducing command. The signal selection component may be excluded, whereupon the reproducing processor outputs, respectively, separate outputs of the signal processing means and waveform shaping means.

13 Claims, 3 Drawing Sheets

REPRODUCING PROCESSOR ALLOWING SELECTIVE INHIBITION OF DROPOUT COMPENSATION AND VIDEO SIGNAL CORRECTION PROCESSING

FIELD OF THE INVENTION

The present invention relates to a reproducing processor for video format signals.

BACKGROUND OF THE INVENTION

A recording and reproducing system is disclosed in U.S. Pat. No. 4,680,647 which enables voice to be added to pictures obtained at the time of still picture reproduction of recorded information in a recording medium, by executing recording in a recording medium, for example, inserting a digital data including voice information after compressing the time base in a portion of a video format signal and by inserting video information in the remaining portion.

The prior art reproducing processor for reproducing and processing a video format signal recorded in a recording medium with such a system is shown in FIG. 1. In FIG. 1, a disk 1 serving as a recording medium is driven to be rotated by a spindle motor 2. As the disk 1 is rotated, a signal recorded in the disk 1 is read by a pickup 3. The pickup 3 is carried by a slider (not shown) which is moved in the radial direction of the disk 1, and the information detection point (light spot for information detection) of the pickup 3 can freely be positioned in the radial direction of the disk 1. Further, various servo systems such as a spindle servo system, tangential servo system and tracking servo system are also provided. However, they are already well known so that they will not be shown here.

The so-called RF (high frequency) signal output from the pickup 3 is supplied to a video demodulation circuit 6 after it is amplified by an RF amplifier 5. The video signal is demodulated in the video demodulation circuit 6 by undergoing the frequency demodulation processing of the RF signal. The demodulated video signal is supplied to a dropout correction circuit 7. To the dropout correction circuit 7 there is supplied, for example, a high level dropout detection signal from a dropout detection circuit 8. The dropout detection circuit 8 has a constitution in which a dropout detection signal is generated, for example, when the interval between the zero cross points of the RF signal exceeds a predetermined value. Further, the dropout correction circuit 7 is so constructed as to correct the dropout upon receipt of a dropout detection signal, by outputting the dropout section of the video signal by replacing it with the video signal at the time by 1H earlier from now. The output of the dropout correction circuit 7 is supplied to a time base error correction circuit 9. The time base error correction circuit 9 has a variable delay element of, for example, CCD, and is constructed so as to eliminate litters due to eccentricity of the disk or the like by delaying the output of the dropout correction circuit 7 by a time corresponding to the phase difference between the reference signal with a predetermined frequency and the horizontal synchronizing signal in the output of the dropout correction circuit 7.

A video format signal whose jitters are removed by the time base error correction circuit 9 is supplied to a pulse waveform shaping circuit 10. The pulse waveform shaping circuit 10 consists, for example, of an equalizer having predetermined amplitude and phase characteristics. A video format signal which underwent pulse waveform shaping by which its amplitude is corrected and phase is compensated for by the pulse waveform shaping circuit 10 is supplied to a hue correction circuit 11 and a signal separation circuit 12. The hue correction circuit 11 has, for example, a variable delay element analogous to the time base error correction circuit 9, and it is constructed so as to eliminate jitters in chroma level by delaying the video format signal by a time corresponding to the phase difference between the color burst in the video format signal and a reference signal with a predetermined frequency. The output of the hue correction circuit 11 is supplied to a noise reduction circuit 13 with a constitution by which, for example, a micro level of the signal is detected and added to the original signal with reversed phase. After suppression of noise with this arrangement, the signal is supplied to a character insertion circuit 14. The character insertion circuit 14 has a constitution by which a video signal corresponding to the character indicated by the data sent from a system controller 15 is synthesized with the video format signal output from the noise reduction circuit 13. The output of the character insertion circuit 14 is supplied to the output terminal OUT.

On the other hand, in the signal separation circuit 12, horizontal and vertical synchronizing signals and a control signal indicating the recording position inserted to the portion corresponding to a predetermined line in the flyback period are separated out from the video format signal and are supplied to the system controller 15. The system controller 15 is composed of a microcomputer consisting, for example, of a processor, ROM, RAM and the like, and carries out arithmetic operation based on a data or program stored in ROM, RAM or the like by a command supplied from an external equipment. The system controller 15 then supplies instruction signals such as play, pause, search and the like to a playing unit control circuit 16 and supplies a data designating a character to be inserted to the character insertion circuit 14.

With the constitution as in the above, when a dropout is generated in a section where a digital data of a video format signal is inserted, the section is replaced by the signal precedent by 1H, creating an inconvenience that an uncorrectable error is generated in the digital data. Moreover, the amplitude characteristic and the phase characteristic of the digital data are set by the digital data waveform shaping circuit 9 so as to give a minimum read error rate. For this reason, there has also been a drawback in that the variable ranges in video making such as the adjustment of the amount of noise reduction and frequency characteristic for the section carrying the video information of the video format signal becomes narrowed down making it different to obtain a desired video.

SUMMARY OF THE INVENTION

The present invention was aimed at resolving these problems in the prior art, and it is, therefore, an object of the present invention to provide a reproducing processor for the processing of a video format signal and which is capable of selectively inhibiting dropout correction during dropout for preventing the generation of uncorrectable errors in a digital data, reducing the read error-ratio of the digital data, and enables a system to form a desired video.

The reproducing processor of video format signal in accordance with the present invention is equipped with command means for generating a reproducing command for a digital data section, dropout compensation command means for issuing a dropout compensation command in response to the digital section reproducing command, dropout compensation means for carrying out dropout compensation of a video format signal obtained from a recording medium in response to a command from the dropout compensation command means, signal processing means for carrying out video signal correction processing for an output of the dropout compensation means, and waveform shaping means for shaping the pulse waveform of an output of the dropout compensation means, whereby either one of the outputs of the signal processing means and the waveform shaping means is output selectively, or the respective outputs of the signal processing means and the waveform shaping means are output, depending upon the digital data section reproducing command.

BRIEF DESCRIPTION OF THE DRAWINGS

The above and further objects, features and advantages of the present invention will become more apparent from the following detailed description taken with the accompanying drawings, in which.

DETAILED DESCRIPTION OF THE INVENTION

Figure 1:
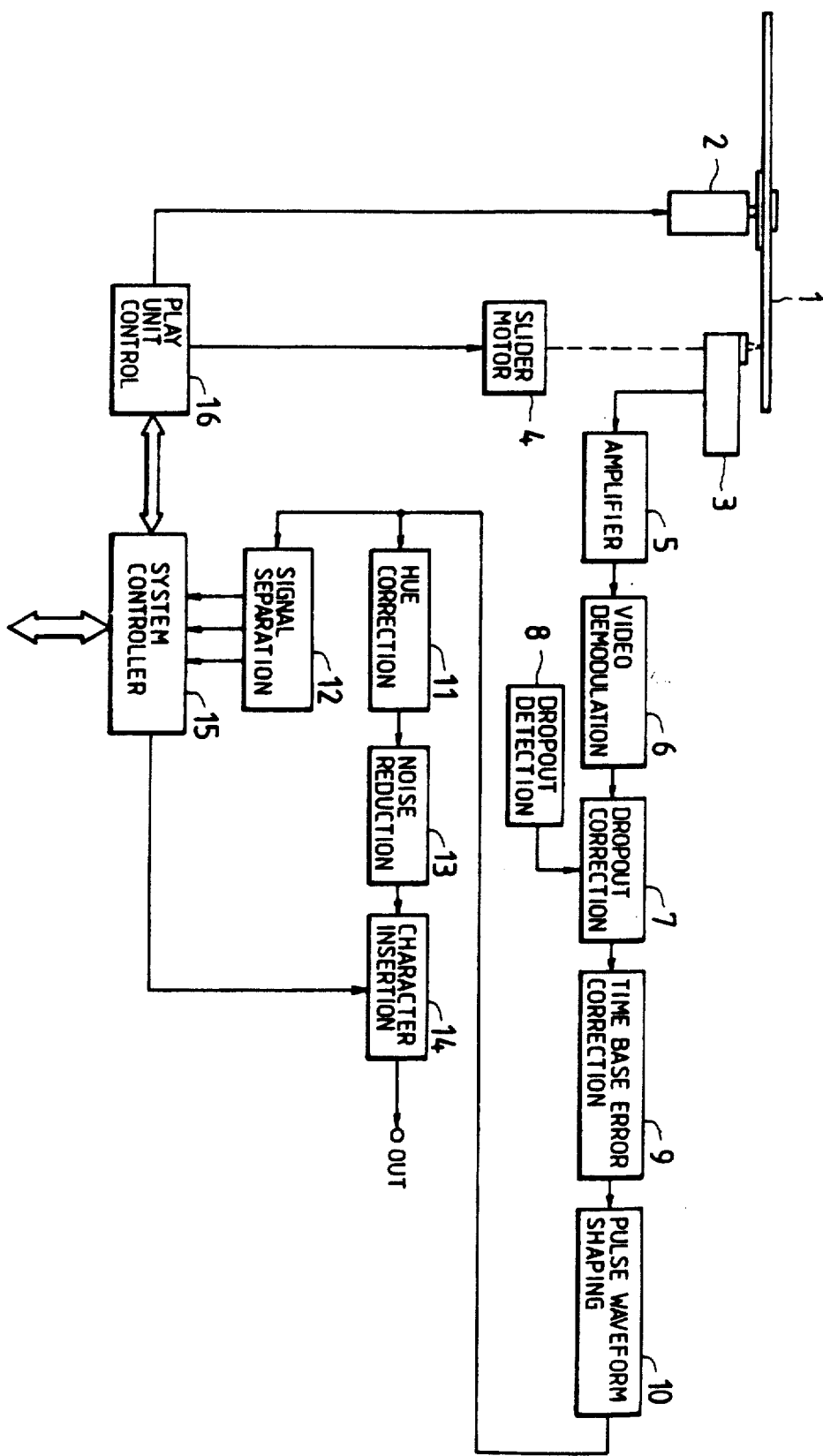
FIG. 1 is a block diagram showing the prior art reproducing processor.
Figure 2:
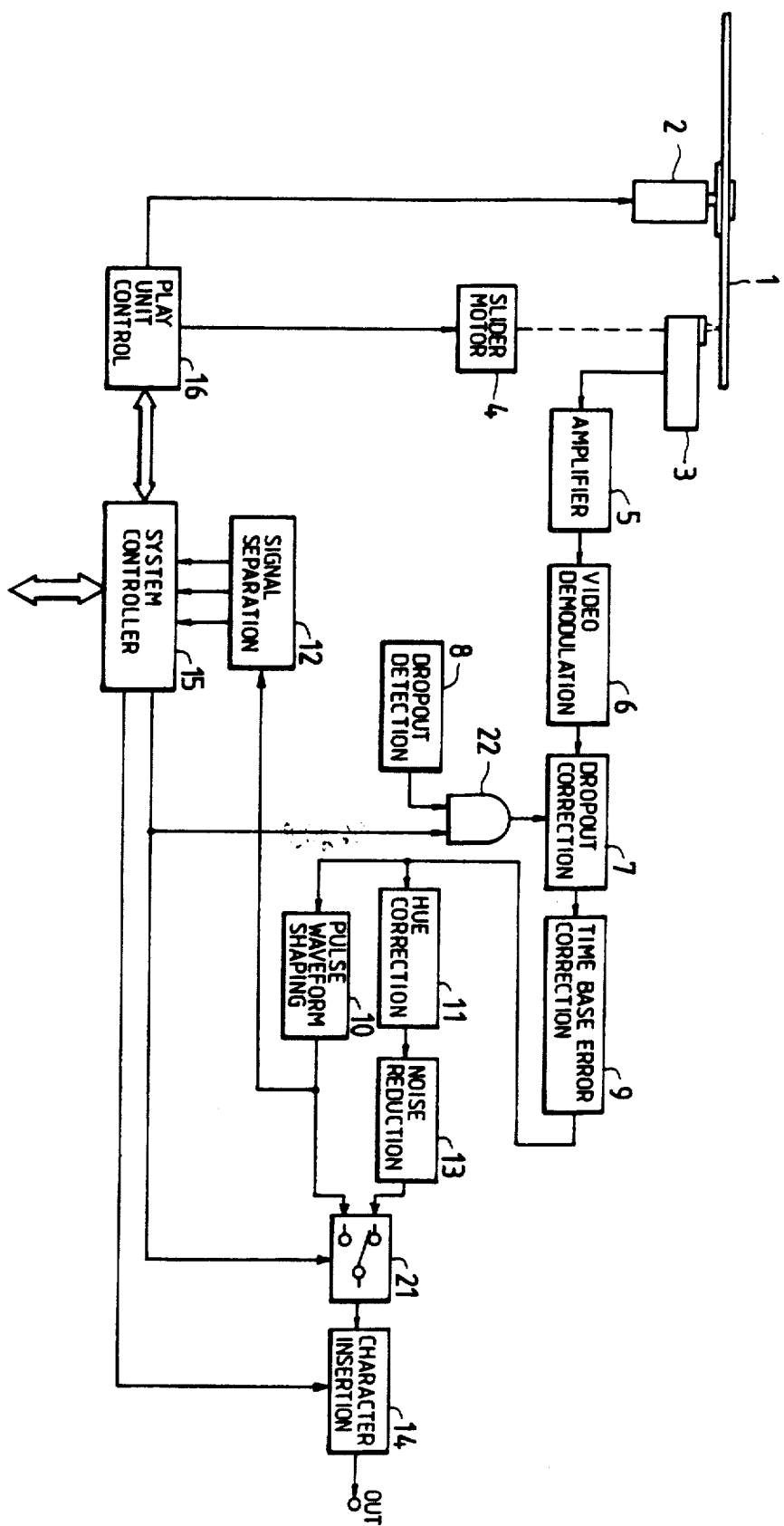
FIG. 2 is a block diagram showing an embodiment of the present invention.
Figure 3:
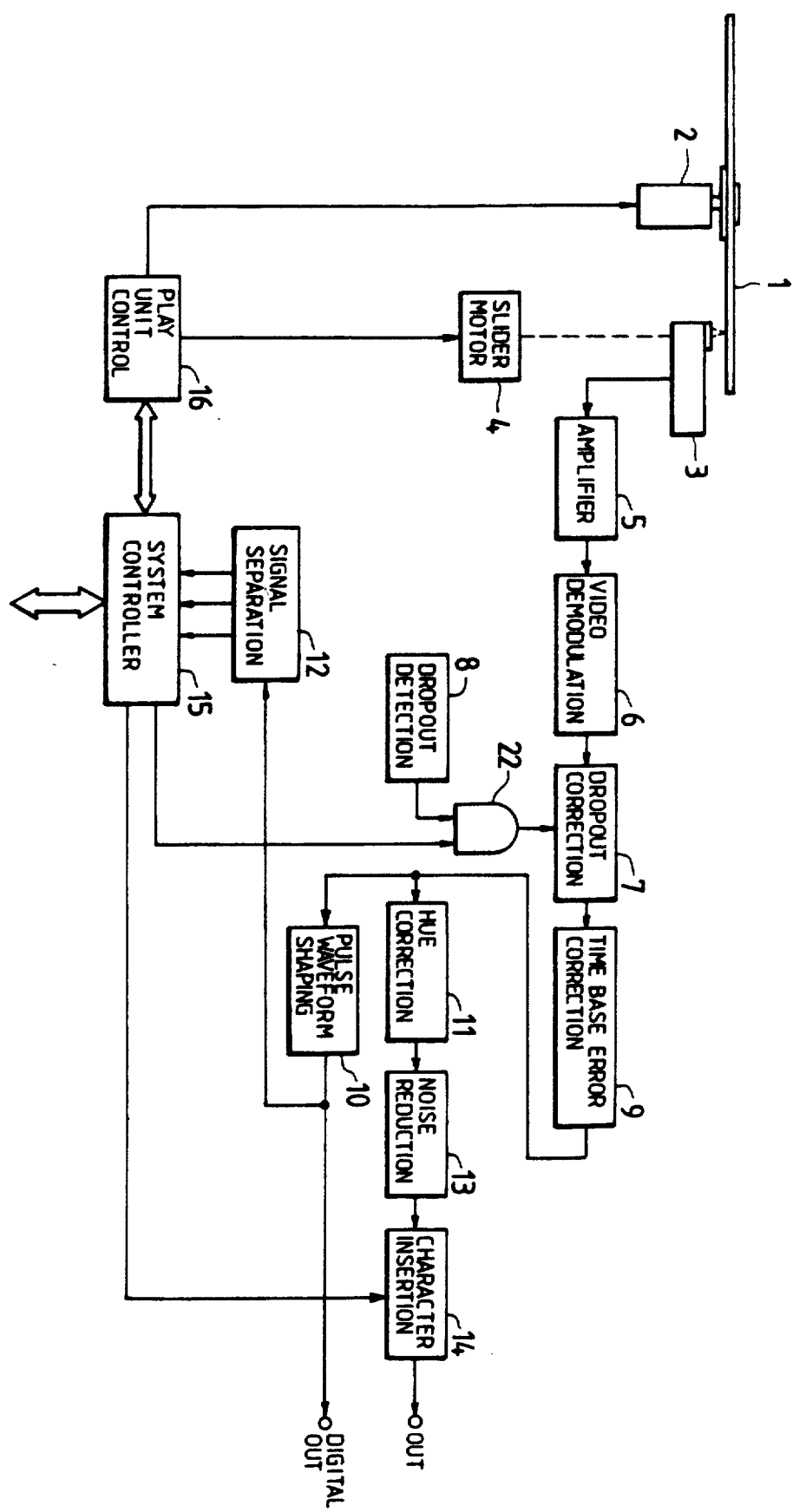
FIG. 3 is a block diagram showing another embodiment of the present invention.

Referring to FIG. 2, an embodiment of the present invention will be described in detail in what follows.

In FIG. 2, disk 1, spindle motor 2, pickup 3, slider motor 4, RF amplifier 5, video demodulation circuit 6, dropout correction circuit 7, time base error correction circuit 9 and pulse waveform shaping circuit 10 are connected in the same way as for the device in FIG. 2. In the present embodiment, however, the output of the time base error correction circuit 9 is supplied to the pulse waveform shaping circuit 10 as well as to the hue correction circuit 11. The output of the hue correction circuit 11 is supplied to one of the input terminals of a changeover switch 21 via the noise reduction circuit 13. To the other input terminal of the changeover switch 21 there is supplied the output of the pulse waveform shaping circuit 10. The changeover switch 21 selectively outputs selecting the output of the pulse waveform shaping circuit 10 in response to a low-level digital data section reproducing command signal, for example, output from the system controller 15, and in the absence of a digital data section reproducing command signal selectively outputs the output of the noise reduction circuit 13. The output of the changeover switch 21 is supplied via the character insertion circuit 14 to the output terminal OUT.

Further, a dropout detection signal of high level, for example, output from the dropout detection circuit 8 is supplied to one of the input terminals of an AND gate 22. To the other input terminal of the AND gate 22, there is supplied a digital data section reproducing command signal from the system controller 15. When the digital data section reproducing command signal is high-level, the high-level output from the AND gate 22 is supplied to the dropout correction circuit 7 as a dropout detection signal.

Moreover, when the output of the digital data is commanded by an external equipment, the system controller 15 sends out an instruction to a playing unit control circuit 16 for searching the section where bhe digital data is inserted, and outputs a digital data section reproducing command signal of low level.

With the constitution described as in the above, when a command for outputting the digital data is supplied to the system controller 15, a digital data section reproducing command signal of low level is output from the system controller 15, which is supplied to the changeover switch 21 and the AND gate 22. Then, an output of a pulse waveform shaping circuit 10 is selectively output from changeover switch 21, and the output of a dropout detection signal from the AND gate 22 is suppressed. As a result, the dropout correction by the dropout correction circuit 7 is ceased to be operated, and a video format signal whose waveform is shaped by the pulse waveform shaping circuit 10 is output selectively. Accordingly, the digital data will no longer be replaced by the signal preceding by 1H even when there is generated a dropout, making it a plain error data, so that its correction becomes feasible. Further, the digital data no longer passes through the hue correction circuit 11 and the noise reduction circuit 13 so that it becomes possible to reduce the read error rate without deteriorating the waveform as a digital data signal. In addition, the pulse waveform shaping circuit 10 becomes available exclusively to the digital data, securing the degree of freedom in design.

Moreover, when an instruction for output of the digital data is not supplied to the system controller 15, no digital data section reproducing command signal of low level is output. Therefore, the output of the noise reduction circuit 13 is selectively output from the changeover switch 21, and a dropout detection signal output from the dropout detection circuit 8 is supplied to the dropout correction circuit 7 via the AND gate 22. As a result, dropout correction is carried out by the dropout correction circuit 7 and a video format signal which passed through the pulse waveform shaping circuit 10 will not be output, while a video format signal which passed through the hue correction circuit 11 and the noise reduction circuit 13 is selectively output. Consequently, it becomes possible to set at will the characteristics of the hue correction circuit 13 and the noise reduction circuit 13, enabling a system to obtain a video which is desired.

Furthermore, in the present embodiment there is provided a changeover switch 21 for selecting the output of either one of the pulse waveform shaping circuit 10 or the noise reduction circuit 13. However, it may be so arranged to remove the changeover switch 21 to supply the output of the noise reduction circuit 13 directly to the character insertion circuit 14 and to supply the output of the pulse waveform shaping circuit 10 to a separately provided output terminal.

Still further, in the above embodiment, the digital data included in the video format signal is assumed to be a digital audio data. However, the digital data may be either one of various kinds of programs such as a computer program for controlling the player, a teletext or the like.

In the foregoing, description of the present invention has been presented in conjunction with the case where the video format signal is recorded in a video disk, but the present invention is applicable also to the case where the video format signal is recorded in a video tape.

As has been described in detail in the foregoing, the reproducing processor of video format signal in accordance with the present invention includes command means for issuing a digital data section reproducing command, dropout compensation command means for issuing a dropout compensation command in response to the digital section reproducing command, dropout compensation means for carrying out dropout compensation for a video format signal obtained from a recording medium in response to a command from the dropout compensation command means, signal processing means for carrying out video signal correction processing to an output of the dropout compensation means, and waveform shaping means for shaping the pulse waveform of an output of the dropout compensation means, whereby arrangement being made either to output selectively one of the outputs of the signal processing means and the pulse waveform shaping means or to output both outputs of the signal processing means and the waveform shaping means separately. Accordingly, in the reproducing processor in accordance with the present invention, there can be obtained a video format signal which is not subjected to the dropout compensation, does not go through the signal processing means, and goes through the pulse waveform shaping means, and a video format signal which does not go through the waveform shaping means and goes through the signal processing means. Therefore, it becomes possible to prevent the occurrence of uncorrectable error of digital data, to reduce the read error rate of the digital data, and to obtain a desired video.

While the preferred embodiment of the present invention has been shown and described, it will be obvious to those skilled in the art that various modifications and substitutions may be made without departing from the spirits of the invention which is to be limited only within the scope of the appended claims.

What is claimed is:

1. A reproducing processor a video format signal and allowing, during dropout, selective inhibition of at least one of dropout compensation and video signal correction processing, for preventing production of uncorrectable errors due to a processing of digital data of said video format signal, said processor comprising:
    reproducing means for obtaining a video format signal from a medium in which a video format signal including a plurality of successive line signal portions is recorded, with each line signal portion including a horizontal synchronizing signal portion followed by an information signal portion, said video format signal containing video information corresponding to an image to be displayed and digital data;
    command means for issuing a digital data signal reproducing command for inhibiting at least one of dropout compensation and video signal correction processing;
    dropout compensation means for carrying out dropout compensation for a video format signal obtained from said reproducing means in the absence of said digital data signal reproducing command, and not carrying dropout compensation in response to; said digital data signal reproducing command;
    signal processing means for carrying out video signal correction processing for an output from said dropout compensation means;
    waveform shaping means for shaping a pulse waveform of an output from said dropout compensation means; and
    signal selection means for selectively outputting an output of said waveform shaping means in response to said digital data signal reproducing command, and for selectively outputting an output of said signal processing means in the absence of said digital data signal reproducing command.

2. A reproducing processor as claimed in claim 1, wherein data of said digital data is a digital audio signal.

3. A reproducing processor as claimed in claim 1, wherein data of said digital data is a computer program for controlling a reproducing apparatus.

4. A reproducing processor as claimed in claim 1, wherein data of said digital data is data corresponding to teletext text.

5. A reproducing processor as claimed in claim 1, wherein said recording medium is a video disk.

6. A reproducing processor as claimed in claim 1, wherein said recording medium is a video tape.

7. A reproducing processor for processing a video format signal and allowing, during dropout, selective inhibition of at least one of dropout compensation and video signal correction processing, for preventing production of uncorrectable errors due to a processing of digital data of said video format signal, said processor comprising:
    reproducing means for obtaining a video format signal from a medium in which a video format signal including a plurality of successive line signal portion is recorded, with each line signal portion including a horizontal synchronizing signal portion followed by an information signal portion, said video formal signal containing video information corresponding to an image to be displayed and digital data;
    command means for issuing a digital data signal reproducing command for inhibiting at least one of dropout compensation and video signal correction processing;
    dropout compensation means for carrying out dropout compensation for a video format signal obtained from said reproducing means in the absence of said digital data signal reproducing command, and not carrying dropout compensation in response to said digital data signal reproducing command;
    signal processing means for carrying out video signal correction processing for an output from said dropout compensation means; and
    waveform shaping means for shaping a pulse waveform of an output from said dropout compensation means;
    whereby said reproducing processor outputs, respectively, the outputs of said signal processing means and said waveform shaping means.

8. A reproducing processor as claimed in claim 7, wherein data of said digital data is a digital audio signal.

9. A reproducing processor as claimed in claim 7, wherein data of said digital data is a computer program for controlling a reproducing apparatus.

10. A reproducing processor as claimed in claim 7, wherein data of said digital data is data corresponding to teletext text.

11. A reproducing processor as claimed in claim 7, wherein said recording medium is a video disk.

12. A reproducing processor as claimed in claim 7, wherein said recording medium is a video tape.

13. A reproducing processor for processing a video format signal and allowing, during dropout, selective inhibition of at least one of dropout compensation and video signal correction processing, for preventing production of uncorrectable errors due to a processing of digital data of said video format signal, said processor comprising:

reproducing means for obtaining a video format signal from a medium in which a video formal signal including a plurality of successive line signal portions is recorded, with each line signal portion including a horizontal synchronizing signal portion followed by an information signal portion, said video formal signal containing video information corresponding to an image to be displayed and digital data;

command means for issuing, notwithstanding a presence of video format signal dropout, a digital data signal reproducing command for inhibiting at least one of dropout compensation and video signal correction processing;

dropout compensation means for carrying out dropout compensation for a video format signal obtained from said reproducing means in the absence of said digital data signal reproducing command, and not carrying dropout compensation in response to said digital data signal reproducing command;

signal processing means for carrying out video signal correction processing for an output from said dropout compensation means;

waveform shaping means for shaping a pulse waveform of an output from said dropout compensation means; and signal selection means for selectively outputting an output of said waveform shaping means in response to said digital data signal reproducing command, and for selectively outputting an output of said signal processing means in the absence of said digital data signal reproducing command.

* * * * *